US006556529B1

(12) United States Patent
Onishi et al.

(10) Patent No.: US 6,556,529 B1
(45) Date of Patent: Apr. 29, 2003

(54) DISK RECORDING AND/OR REPRODUCING APPARATUS

(75) Inventors: Sei Onishi, Saitama (JP); Seiji Kurauchi, Tokyo (JP); Tetsuya Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/406,839

(22) Filed: Sep. 28, 1999

(30) Foreign Application Priority Data

Sep. 30, 1998 (JP) .......................................... 10-278277

(51) Int. Cl.⁷ ............................................... G11B 17/04
(52) U.S. Cl. ..................................................... 369/77.1
(58) Field of Search ............................. 369/77.1, 75.1; 360/92, 96.5

(56) References Cited

U.S. PATENT DOCUMENTS

| 5,229,987 A | 7/1993 | Aoki ......................... 369/77.1 |
| 5,265,951 A | 11/1993 | Kumar ..................... 312/223.2 |
| 5,355,358 A | * 10/1994 | Van Alfen .................. 369/77.1 |
| 5,701,216 A | 12/1997 | Yamamoto et al. ....... 360/99.02 |
| 5,793,728 A | 8/1998 | Selby et al. ............... 369/77.1 |
| 5,820,236 A | 10/1998 | Aoki ....................... 312/223.2 |

FOREIGN PATENT DOCUMENTS

| GB | 2235564 | 3/1991 | ......... G11B/15/675 |
| GB | 2295262 | 5/1996 | ........... G11B/33/02 |
| JP | 58108003 | 6/1983 | ............. G11B/1/00 |

OTHER PUBLICATIONS

IBM Corp., "File Anti–contamination Doors," IBM Technical Disclosure Bulletin vol. 33, No. 3A, Aug., 1990, pps. 140–142.

* cited by examiner

*Primary Examiner*—George J. Letscher
(74) *Attorney, Agent, or Firm*—Jay H. Maioli (57) ABSTRACT

A disk recording and/or reproducing apparatus includes: a loading mechanism for drawing a disk having been inserted through an opening portion into the apparatus or drawing the disk having been held in the apparatus out of the opening portion; and an opening/closing sheet having first and second opening/closing portions, the first and second opening/closing portions being deformed by the disk to thereby open/close the opening portion. At least one of the first and second opening/closing portions has at least one deforming portion for facilitating the deformation of the opening/closing portion when the opening/closing portion is deformed by the disk carried by the loading mechanism.

9 Claims, 7 Drawing Sheets

DISK RECORDING AND/OR REPRODUCING APPARATUS

BACKGROUND OF THE INVENTION

The present invention relates to a disk recording and/or reproducing apparatus in which an opening/closing means is mounted to an opening portion allowing insertion or discharge of a disk therethrough, wherein the apparatus is intended to attain the suitable insertion or discharge operation of the disk without degrading the function of the opening/closing means.

Of disk recording and/or reproducing apparatuses, for example, disk players capable of recording and/or reproducing an optical disk or a magnetic disk, there is known a type provided with an opening/closing means for opening/closing an opening portion allowing insertion or discharge of a disk therethrough, for example, a sheet formed of a synthetic fiber sheet. Such a sheet is provided for preventing damages of a disk upon insertion or discharge of the disk, shielding the inner structure of the apparatus, and preventing permeation of dust in the apparatus.

Figure 11:
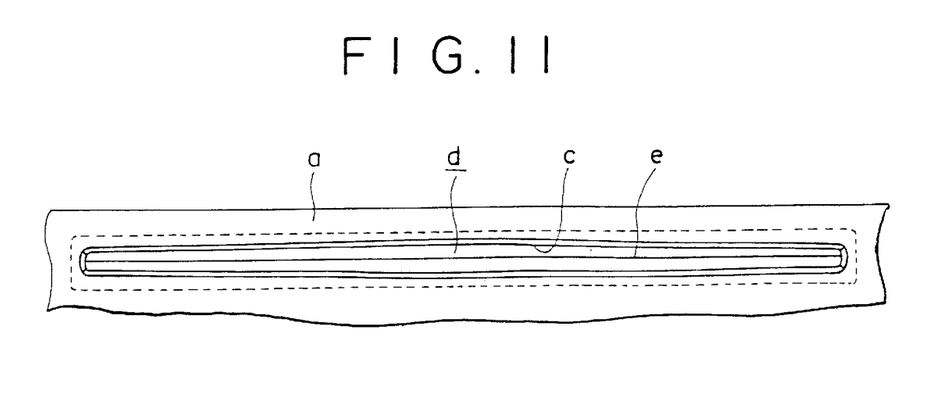
FIG. 11 is an enlarged front view of a related art disk player, showing an opening portion and a sheet covering the opening portion.
Figure 12:
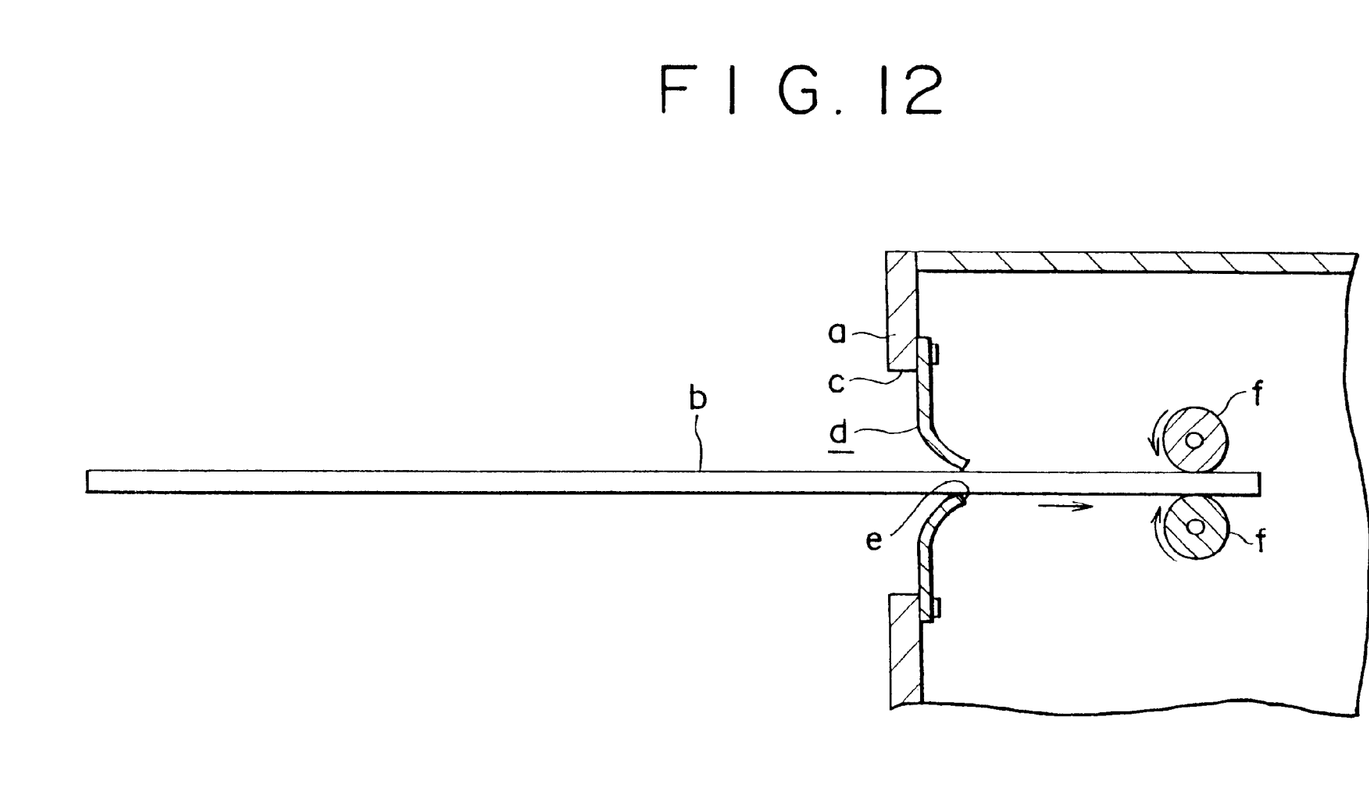
FIG. 12 is an enlarged vertical sectional view of the related art disk player shown in FIG. 11, showing a state in which a disk is inserted in the disk player.

FIGS. 11 and 12 show a portion of a disk player provided with such a sheet.

A front surface portion "a" of the disk player has an opening portion "c" through which a disk "b" is to be inserted in or discharged from the disk-player. A sheet "d" having a laterally-elongated rectangular shape is mounted on the back surface of the front surface portion "a" by a suitable means such as fusion in such a manner as to cover the opening portion "c" from the back surface side.

The sheet "d" is formed of typically a synthetic fiber sheet having a specific flexibility. The upper and lower ends of the sheet "d" are mounted on the upper and lower opening edges of the opening portion "c", respectively. The sheet "d" has, at its center in the vertical direction, a slit "e" extending longer in the lateral direction, through which the disk "b" is to be inserted in or discharged from the disk player.

Two rollers "f" are provided in the disk player in such a manner as to be rotatably supported by supporting members (not shown). The rollers "f" are adapted to hold the disk "b" in the vertical direction and to be rotated in specific directions reversed to each other for drawing the disk "b" in the disk player or drawing it out of the opening portion "c".

To be more specific, when the disk "b" is inserted from the opening portion "c" up through a specific position through the slit "e" of the sheet "d", it is held between the rollers "f" and is then drawn inwardly by rotation of the rollers "f". At this time, since the disk "b" is inserted through the slit "e", the portion of the sheet "d" being in contact with the disk "b" is deflected inwardly as shown in FIG. 12.

When the disk "b" is drawn through the opening portion "c" through the slit "e" by rotation of the rollers "f", the portion of the sheet "d" being in contact with the disk "b" is deflected in the direction reversed to that upon drawing of the disk "b" in the disk player, that is, deflected outwardly.

The disk player provided with the sheet "d" for opening/closing the opening portion "c" as described above, however, has a problem. When passing through the slit "e", the disk "b" is brought into contact with the sheet "d", with a result that a load is applied from the sheet "d" on the disk "b" moved to be inserted in or discharged from the disk player. The load is imparted to the rollers "f", via the disk "b", to obstruct the suitable insertion or discharge operation of the disk "b".

In particular, if there are variations in thickness and/or hardness of the sheet "d", the degree of obstruction to the movement of the disk "b" is changed depending on the degree of the variations, and at the worst case, the insertion or discharge operation of the disk "b" by rotation of the rollers "f" are interrupted.

SUMMARY OF THE INVENTION

An object of the present invention is to solve the above-described problem and to optimize the insertion or discharge operation of a disk without degrading the function of an opening/closing means configured as a sheet.

To achieve the above object, according to a first aspect of the present invention, there is provided a disk recording and/or reproducing apparatus including: a loading means for drawing a disk having been inserted from an opening portion in the apparatus or drawing the disk having been held in the apparatus out of the opening portion; and an opening/closing means having first and second opening/closing portions, the first and second opening portions being deformed by the disk to thereby open/close the opening portion; wherein at least one of the first and second opening/closing portions has at least one deforming portion for facilitating the deformation of the opening/closing portion when the opening/closing portion is deformed by the disk carried by the loading means.

To achieve the above object, according to a second aspect of the present invention, there is also provided a disk recording and/or reproducing apparatus including: a loading means for drawing a disk having been inserted from an opening portion in the apparatus and drawing the disk having been held in the apparatus out of the opening portion; and an opening/closing member having a slit for allowing the disk carried by the loading means to pass therethrough, the opening/closing member being deformed when the disk carried by the loading means passes through the slit, to thereby open/close the opening portion; wherein the opening/closing member has at least one deforming portion which facilitates deformation of the opening/closing member when the opening/closing member is deformed by the disk carried by the loading means.

With the above configuration of each of the disk recording and/or reproducing apparatuses according to the first and second aspects of the present invention, it is possible to reduce a load applied from the opening/closing means on a disk moved to be inserted or discharged from the apparatus.

DETAILED DESCRIPTION OF THE PREFERRED EMBODIMENTS

Hereinafter, embodiments of a disk recording and/or reproducing apparatus according to the present invention will be described with reference to the accompanying drawings.

In the embodiments, the disk recording and/or reproducing apparatus according to the present invention is applied to a disk player used as car audio equipment for reproducing an optical disk.

Referring to FIGS. 1 to 4, there is shown a disk player 1 including a housing 2, a sub-panel 3, and a front panel 4. Necessary members are disposed in the housing 2.

The housing 2 having a box-shape opened forwardly is formed by mounting a top board 2b from above on a main body 2a opened forwardly and upwardly.

The sub-panel 3 is mounted to the housing 2 in such a manner as to cover the front side of the housing 2. The upper end portion of the sub-panel 3 has an opening portion 5 extending longer in the lateral direction. The width of the opening portion 5 in the lateral direction is set to be slightly larger than the outside diameter of a disk 6. The width of the opening portion 5 in the vertical direction is set to become large in the direction from each of the right and left ends to the center of the opening portion 5.

Figure 1:
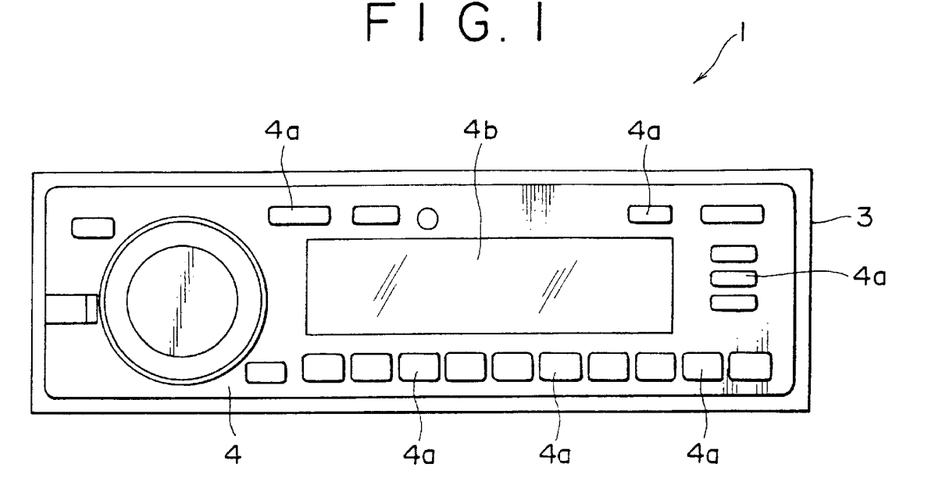
FIG. 1 is a schematic front view of a disk player of the present invention.
Figure 2:
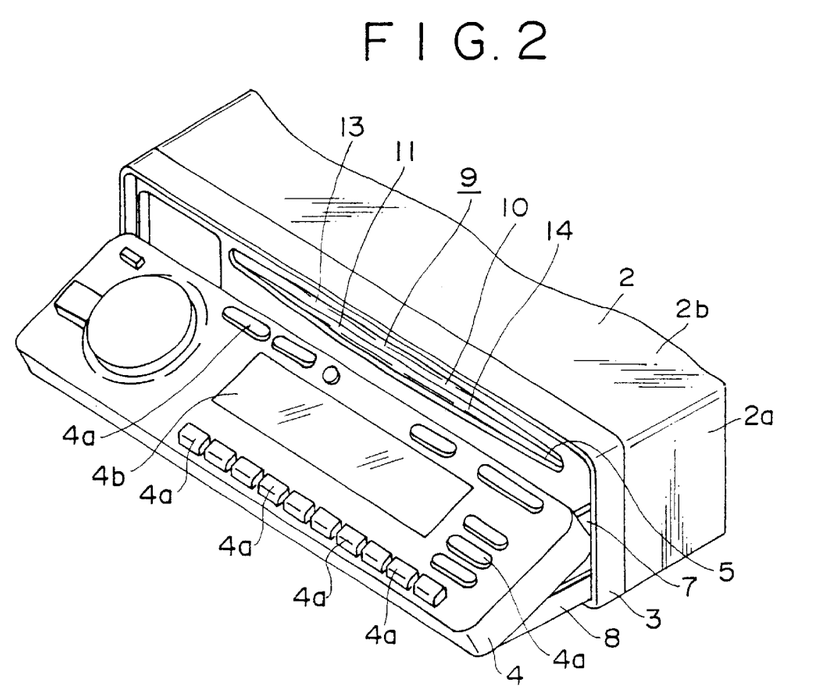
FIG. 2 is a schematic perspective view showing part of the disk player.

The front panel 4 is formed into an approximately rectangular shape elongated in the lateral direction. A plurality of operational buttons 4a for carrying out various operations and a display portion 4b for displaying an operational state are provided on the front surface of the front panel 4.

The front panel 4 is supported by the housing 2 via two first arms 7 and two second arms 8 in such a manner as to be movable between a first position at which the disk 6 cannot be inserted through the opening portion 5 and a second position at which the disk 6 can be inserted through the opening portion 5.

Figure 3:
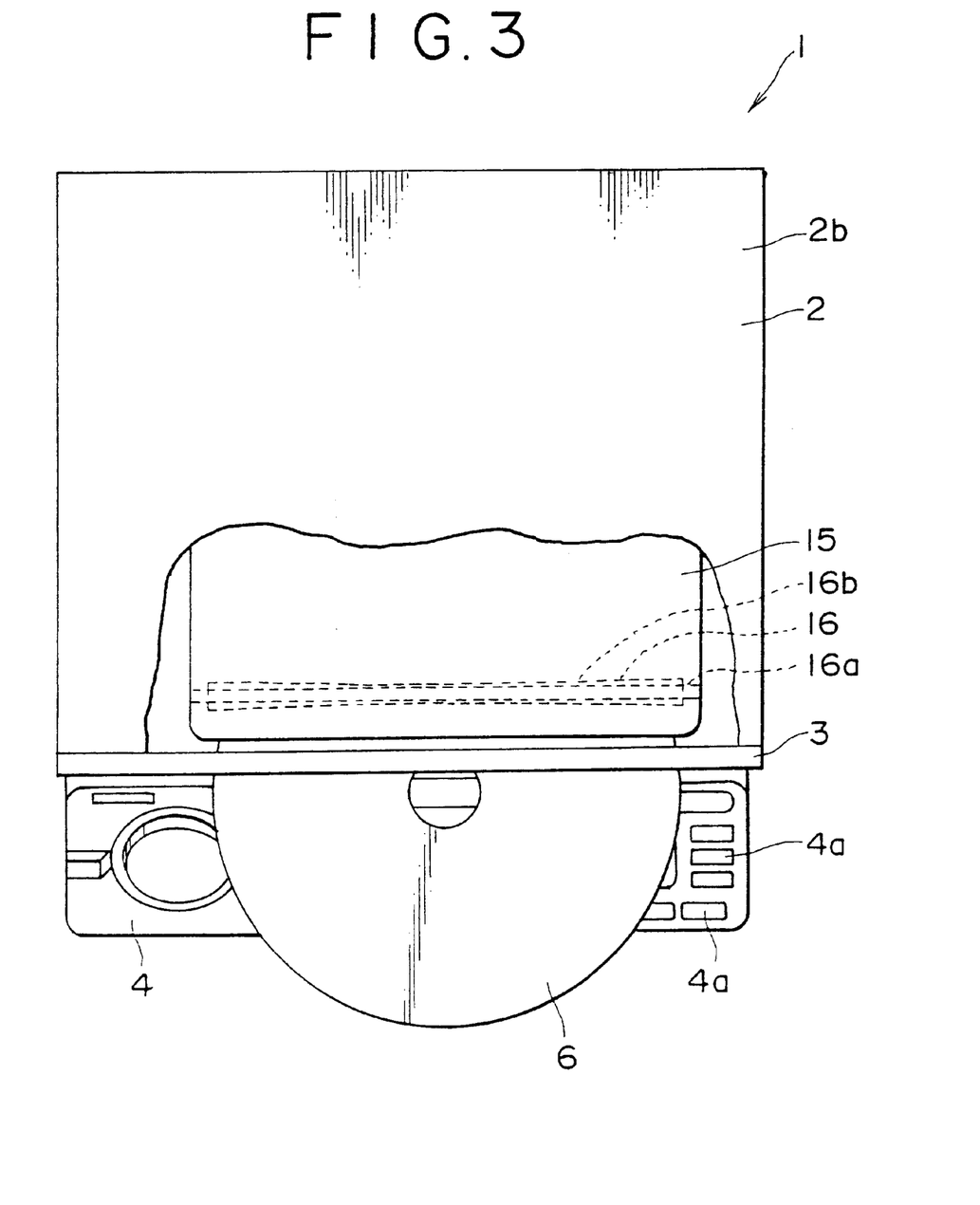
FIG. 3 is a schematic plan view, with parts partially cutaway, of the disk player in a state in which a disk is inserted in the disk player.
Figure 4:
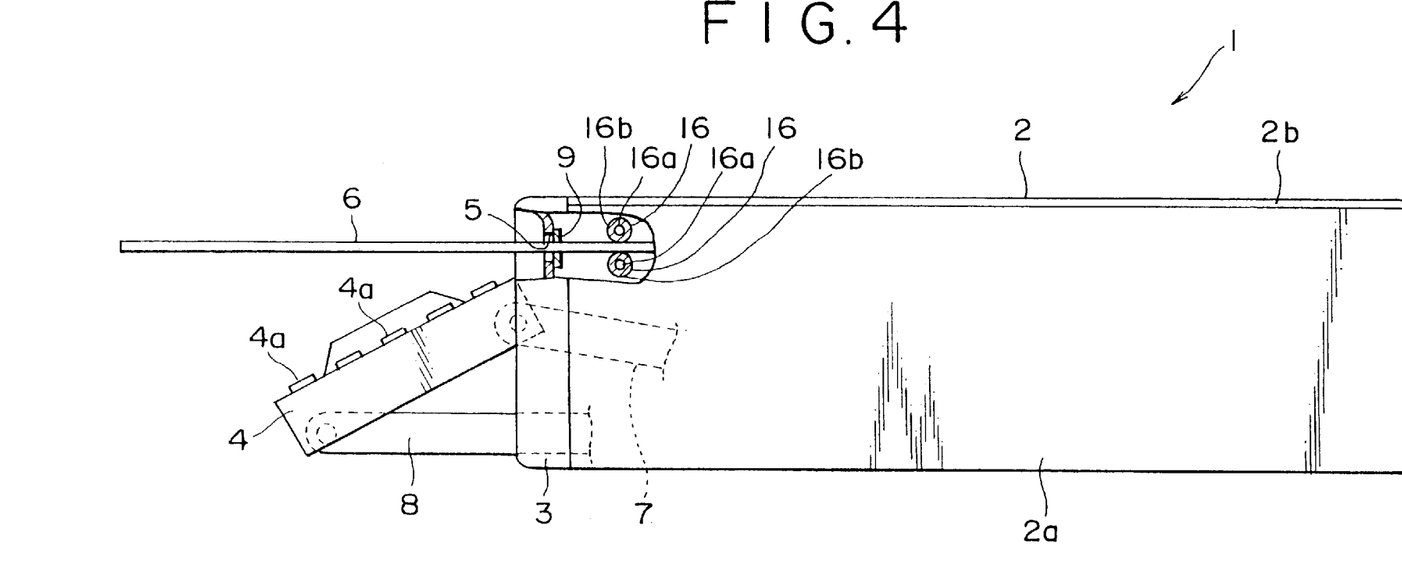
FIG. 4 is a schematic side view, with parts partially cutaway, of the disk player in the state in which the disk is inserted in the disk player.

The front ends of the first arms 7 are turnably supported by the housing 2 in such a manner as to be substantially in the vertical direction, and the upper ends of the right and left end portions of the front panel 4 are turnably supported by the first arms 7. The second arms 8 are supported by the housing 2 in such a manner as to be movable in the longitudinal direction, and the lower ends of the right and left end portions of the front panel 4 are turnably supported by the second arms 8.

In the state in which the front panel 4 is located at the first position, if the front ends of the first arms 7 are turned to be moved downwardly and simultaneously the second arms 8 are moved forwardly, the upper end of the front panel 4 is moved downwardly along the front surface of the sub-panel 3 and simultaneously the lower end of the front panel 4 is tilted in such a manner as to be protruded forwardly. The front panel 4 at the first position is thus moved to the second position shown in FIGS. 2 to 4, at which the disk 6 can be inserted in or discharged from the housing 2 through the opening portion 5 formed in the sub-panel 3. Alternatively in the state in which the front panel 4 is located at the second position, if the first arms 7 are turned to be moved upwardly and simultaneously the second arms 8 are moved backwardly, the upper end of the front panel 4 is moved upwardly along the front surface of the sub-panel 3 and simultaneously the lower end of the front panel 4 is moved backwardly. The front panel 4 at the second position is thus moved to the first position shown in FIG. 1, at which the disk 6 cannot be inserted in or discharged from the housing 2 through the opening portion 5 formed in the sub-panel 3.

The above operation of the front panel 4 is performed by depressing one of the operating buttons 4a provided on the front panel 4 to actuate a drive mechanism (not shown), provided in the housing 2, to which the first arms 7 and the second arms 8 are connected.

Referring to FIGS. 4 to 7, a sheet 9 is mounted on the sub-panel 3.

Figure 5:
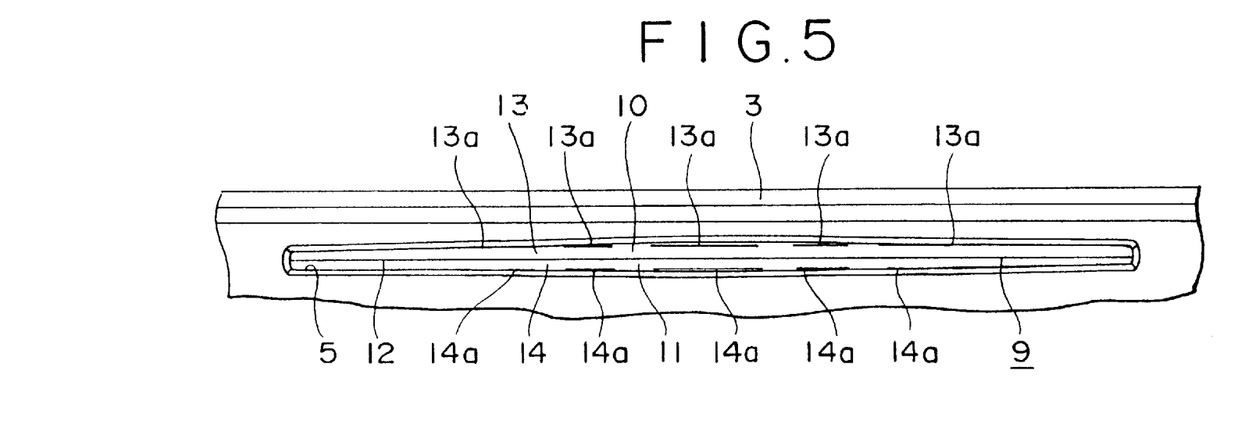
FIG. 5 is an enlarged front view of an essential portion of the disk player.
Figure 6:
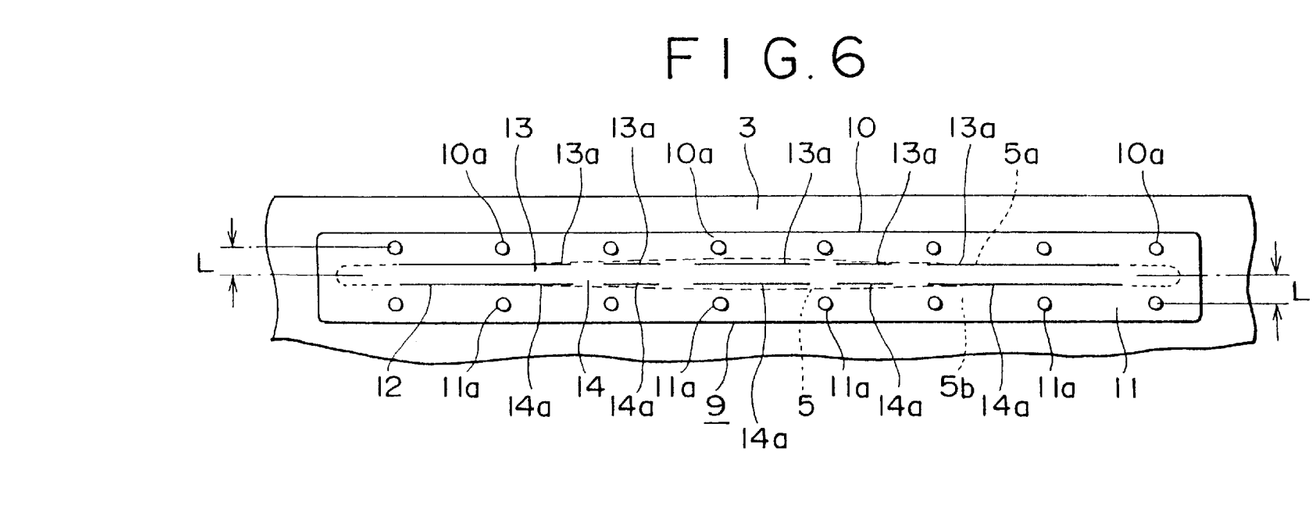
FIG. 6 is an enlarged rear view of an essential portion of the disk player.

The sheet 9 is formed of a synthetic fiber sheet having a specific flexibility, for example, a suede-like artificial leather sheet sold by Toray Industries, Inc. under the trade name "ECSAINE", and has an approximately rectangular shape elongated in the lateral direction and being larger than the opening portion 5. The sheet 9 is composed of a first member 10 and a second member 11 which are identical to each other in terms of the size and shape.

Figure 7:
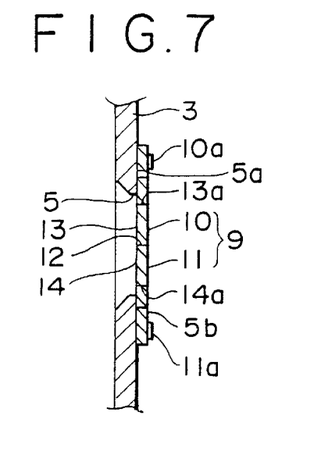
FIG. 7 is an enlarged vertical sectional view of an essential portion of the disk player.

Referring to FIGS. 6 and 7, the upper end portion of the first member 10 is fused, at a plurality of fusion points 10a, to an upper opening edge 5a of the opening portion 5 on the back surface of the sub-panel 3, and the lower end portion of the second member 11 is fused, at a plurality of fusion points 11a, to a lower opening edge 5b of the opening portion 5 on the back surface of the sub-panel 3. In the state in which the first member 10 and the second member 11 of the sheet 9 are fused to the opening edges 5a and 5b of the opening portion 5 as described above, the lower end of the first member 10 and the upper end of the second member 11 are butted to each other to form a butt portion 12. The disk 6 is inserted in or discharged from the housing 2 through the butt portion 12. In addition, since the sheet 9 is mounted on the sub-panel 3 as described above, the opening portion 5 is covered with the sheet 9 from the back side.

Portions of the sheet 9 defined by excluding the upper and lower end portions from the sheet 9 play a role of opening/closing the opening portion 5. To be more specific, a portion 13 defined by excluding the upper end portion of the first member 10 from the first member 10 and a portion 14 defined by excluding the lower end portion of the second member 11 from the second member 11 are deflected in a specific direction when the disk 6 is inserted in or discharged from the housing 2 and are returned to the original states after the disk 6 is inserted in or discharged from the housing 2, to open/close the opening portion 5. Accordingly, the portions 13 and 14 function as first and second opening/closing portions for opening/closing the opening portion 5, respectively.

A plurality of notches 13a, each of which extends in the lateral direction, are formed in the first opening/closing portion 13 of the first member 10 in such a manner as to be spaced from each other. Similarly, a plurality of notches 14a, each of which extends in the lateral direction, are formed in the second opening/closing portion 14 of the second member 11 in such a manner as to be spaced from each other. A distance from the butt portion 12 to each of the notches 13a is set to be equal to that from the butt portion 12 to each of the notches 14a. The notches 13a and 14a function as a deforming portion for facilitating the deformation (deflection) of the first and second opening/closing portions 13 and 14 when the disk 6 is inserted in or discharged from the housing 2.

Referring back to FIGS. 3 and 4, a mechanical deck 15 is provided in the housing 2, and two rollers 16 are rotatably supported by the mechanical deck 15. The rollers 16 are rotated in a state in which they hold the disk 6 therebetween, thereby moving the disk 6 in a specific direction.

Each roller 16 is composed of a shaft 16a to be supported, around which a cylindrical roller portion 16b made from an elastic member such as rubber is fixed. Both end portions of the shaft 16a of each roller 16 are rotatably supported by both side surface portions of the mechanical deck 15. Each roller 16 can be rotated normally and reversely by a roller drive mechanism (not shown) provided in the housing 2.

When one of the operational buttons 4a provided on the front panel 4 is depressed and thereby the front panel 4 is moved from the first position to the second position as described above, the opening portion 5 formed in the sub-panel 3 emerges on the front side of the disk player. The disk 6 is then inserted through the butt portion 12 of the sheet 9. At this time, the first and second opening/closing portions 13 and 14 are deflected inwardly by amounts corresponding to the thickness of the disk 6.

When inserted up to a specific position, the disk 6 is vertically held between the rollers 16, and is drawn in the housing 2 by rotation of the rollers 16.

At this time, part of the disk 6 is in contact with the first opening/closing portion 13 of the first member 10 and the second opening/closing portion 14 of the second member 12; however, since the notches 13a and 14a are formed in the sheet 9, the first and second opening/closing portions 13 and 14 are easily deformed and thereby a load applied from the sheet 9 onto the disk 6 is made small. As a result, the drawing of the disk 6 in the housing 2 by rotation of the rollers 16 can be smoothly performed.

After termination of the drawing of the disk 6 in the housing 2 by rotation of the rollers 16, the disk 6 is mounted on a mounting portion (not shown) disposed in the housing 2. The front panel 4 is then moved from the second position to the first position. After that, the reproducing operation of the disk 6 is started by depressing one of the operational buttons 4a.

After termination of the reproducing operation of the disk 6, the mounting state of the disk 6 on the mounting portion is released by depressing one of the operational buttons 4a. At this time, the front panel 4 is moved from the first position to the second position, and the disk 6 is held between the rollers 16 again and is drawn out of the opening portion 5 through the butt portion 12 of the sheet 9 by rotation of the rollers 16.

When the disk 6 is discharged through the butt portion 12, the first and second opening/closing portions 13 and 14 are deflected outwardly by amounts corresponding to the thickness of the disk 6. Even upon this discharge of the disk 6, since the notches 13a and 14a are formed in the sheet 9, the first and second opening/closing portions 13 and 14 are easily deformed and thereby a load applied from the sheet 9 on the disk 6 is made small. Accordingly, the disk 6 can be smoothly discharged by rotation of the rollers 16.

As described above, according to the disk player 1 of the present invention, the sheet 9 has the notches 13a and 14a formed as the deforming portions for facilitating the deformation of the first and second opening/closing portions 13 and 14. Accordingly, it is possible to make smooth the insertion or discharge of the disk 6 without degrading the function of the sheet 9 and to prevent the disk 6 being from damaged due to a load applied from the sheet 9 on the disk 6.

The disk player 1 when used as car audio equipment is generally required to be thin. Accordingly, the vertical width of the opening portion 5 is necessarily made small, so that a distance (designated by character L in FIG. 6) from the butt portion 12 of the sheet 9 to the mounting portion (fusion points 10a and 11a) mounted on the equipment cannot be sufficiently large. As a result, the first and second opening/closing portions 13 and 14 of the sheet 9 are hard to be deformed upon insertion or discharge of the disk 6, and thereby a load applied from the sheet 9 on the disk 6 becomes larger.

According to the present invention, however, by forming the notches 13a and 14a in the sheet 9, the sheet 9 can be easily deformed. Accordingly, in the equipment in which the above distance L cannot be made sufficiently large, the formation of the notches 13a and 14a in the sheet 9 is particularly effective as the means for reducing a load applied from the sheet 9 on the disk 6.

In the disk player 1, since the notches 13a and 14a are formed in the sheet 9 in such a manner as to extend in the lateral direction, that is, in parallel to the extending direction of the opening portion 5, the first and second opening/closing portions 13 and 14 are very easily deformed, to thereby effectively reduce a load applied from the sheet 9 on the disk 6.

Since the plurality of the notches 13a and the plurality of the notches 14a are formed, the first and second opening/closing portions 13 and 14 are more easily deformed, to thereby more effectively reduce a load applied from the sheet 9 on the disk 6.

Figure 8:
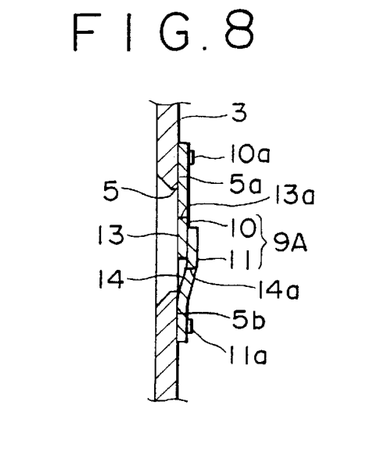
FIG. 8 is an enlarged vertical sectional view of a sheet provided in a state in which members of the sheet are partially overlapped to each other.

In this embodiment, the sheet 9 composed of the first and second members 10 and 11 is mounted to the sub-panel 3 in the state in which the lower end of the first member 10 is butted to the upper end of the second member 11; however, the sheet may be configured as a sheet 9A shown in FIG. 8, in which the sheet 9A is mounted to the sub-panel 3 in a state in which the first member 10 is partially overlapped to the second member 11.

Figure 9:
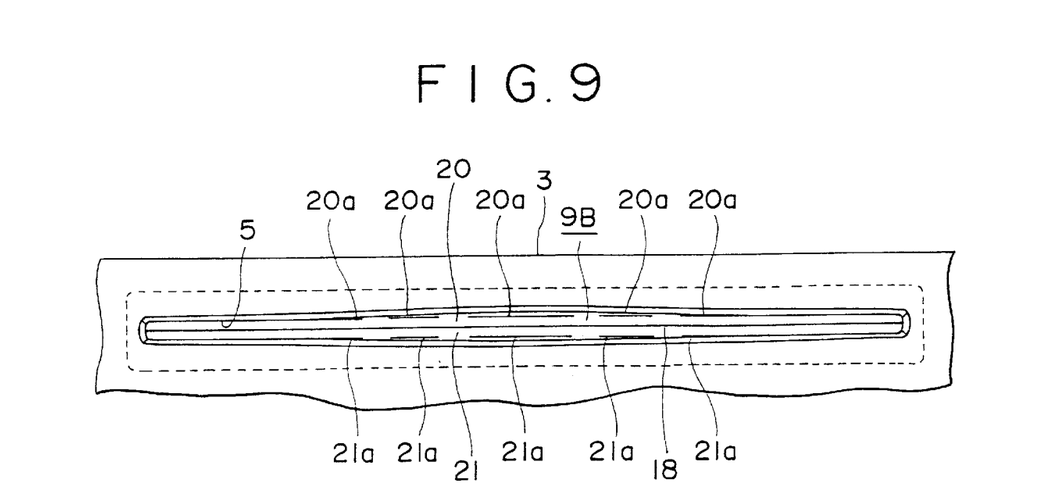
FIG. 9 is an enlarged plan view of a sheet formed of only one member.
Figure 10:
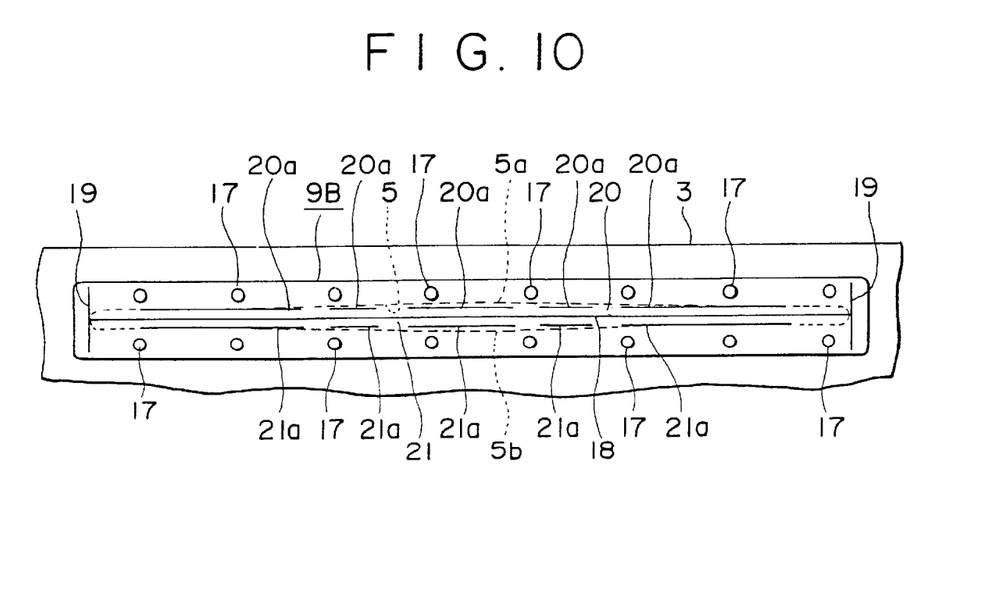
FIG. 10 is an enlarged rear view of the sheet shown in FIG. 9.

FIGS. 9 and 10 show a sheet 9B formed of only one member.

The sheet 9B has the same configuration as that of the sheet 9 except that the sheet 9B is formed of only one member and it has a slit through which the disk 6 is to be inserted in or discharged from the housing 2, and therefore, only different points between the sheet 9 and the sheet 9B will be described in detail, and the parts corresponding to those of the sheet 9 are designated by the same characters and the description thereof is omitted.

Like the sheet 9, the sheet 9B is formed of a synthetic fiber sheet having an approximately rectangular shape being elongated in the lateral direction and being larger than the opening portion 5.

The upper and lower end portions of the sheet 9B are fused, at a plurality of fusion points 17, to the upper opening edge 5a of the opening portion 5 on the back surface of the sub-panel 3. The sheet 9B has, at its center in the vertical direction, a first slit 18 which extends longer in the lateral direction between positions near the right and left ends of the sheet 9B. The sheet 9B also has, at its right and left end portions, two second slits 19 each of which extends in the vertical direction between positions near the upper and lower ends of the sheet 9B and is connected at its center to one of both the ends of the first slit 18.

Portions of the sheet 9B excluding the peripheral edge portions, that is, portions 20 and 21 located above and below the first slit 18 in such a manner as to correspond to the opening portion 5 function as first and second opening/closing portions for opening/closing the opening portion 5. Like the notches 13a and 14a formed in the sheet 9, a plurality of notches 20a and a plurality of notches 21a each extending in the lateral direction are formed in the first and second opening/closing portions 20 and 21, respectively.

In the case of mounting the sheet 9B to the disk player 1, the sheet 9B exhibits the same effect as that obtained by the sheet 9. Concretely, the sheet 9B is effective to make smooth the insertion or discharge of the disk 6 without degrading the function of the sheet 9B and to prevent the disk 6 being from damaged due to a load applied from the sheet 9B on the disk 6.

The sheet 9B formed of only one member has another advantage in reducing the number of parts.

In the above sheet 9 (9A, 9B), a plurality of the notches 13a and 14a (13a and 14a, 20a and 21a) are formed as the deforming portion; however, the number and length of the notches 13a and 14a (13a and 14a, 20a and 21a) may be set such that a load applied from the sheet 9 (9A, 9B) on the disk 6 becomes not more than a specific value in consideration of the thickness and hardness of the sheet 9 (9A, 9B).

In place of the above deforming portion for reducing a load applied from the sheet 9 (9A, 9B) on the disk 6, which is configured as the notches 13a and 14a (13a and 14a, 20a and 21a) formed in the sheet 9 (9A, 9B), another deforming portion for reducing a load applied from the sheet 9 (9A, 9B) on the disk 6, for example, a thinned portion may be formed on the sheet 9 (9A, 9B).

The configuration of the present invention, in which the notches 13a and 14a (13a and 14a, 20a and 21a) are formed in the sheet 9 (9A, 9B) for reducing a load applied to the disk 6 when the disk 6 is inserted in or discharged from the housing 2, can be applied to various kinds of equipment of a so-called slot-in type in which a disk is inserted from an opening portion formed in the equipment.

While the embodiments of the present invention have been described using specific terms, such description is for illustrative purposes only, and it is to be understood that changes and variations may be made without departing from the spirit or scope of the following claims.

What is claimed is:

1. A disk recording and/or reproducing apparatus including a loading mechanism for inserting/discharging a disk and an opening portion, the apparatus comprising:

first and second opening/closing portions which are deformed when said disk is inserted through said opening portion by said loading mechanism to thereby open/close said opening portion, wherein at least one of said first and second opening/closing portions has at least one notch portion, wherein the at least one notch portion functions as a deforming portion for facilitating the deformation of the first and second opening/closing portions.

2. The disk recording and/or reproducing apparatus according to claim 1, wherein said opening portion has an upper and a lower end and is formed into a shape in which a width thereof is longer than an outside diameter of said disk; and one of said first and second opening/closing portions projects downwardly from the upper end of said opening portion, and the other of said first and second opening/closing portions projects upwardly from the lower end of said opening portion.

3. The disk recording and/or reproducing apparatus according to claim 1, wherein said opening portion has an upper end and a lower end and is formed into a shape in which a width thereof is longer than an outside diameter of said disk; and one of said first and second opening/closing portions is deformable at an upper end position thereof located on the upper end of said opening portion, and the other of said first and second opening/closing portions is deformable at a lower end position thereof located on the lower end of said opening portion.

4. The disk recording and/or reproducing apparatus according to claim 1, wherein said notch portion is formed in such a manner as to be substantially parallel to a width direction of said opening portion.

5. The disk recording and/or reproducing apparatus according to claim 1, wherein said notch portion comprises a plurality of notches formed in such a manner as to be substantially parallel to a width direction of said opening portion.

6. A disk recording and/or reproducing apparatus including a loading mechanism for inserting/discharging a disk, and an opening portion, comprising:

an opening/closing member having a slit through which said disk passes at the time of inserting/discharging said disk by said loading mechanism, said opening/closing member being deformed when said disk passes through said slit, to thereby open/close said opening portion, wherein said opening/closing member includes at least one notch portion formed to be deformed when said disk passes through said slit.

7. The disk recording and/or reproducing apparatus according to claim 6, wherein said notch portion is formed in such a manner as to be substantially in parallel to a width direction of said opening portion.

8. The disk recording and/or reproducing apparatus according to claim 6, wherein said notch portion comprises a plurality of notches formed in such a manner as to be substantially in parallel to a width direction of said opening portion.

9. A disk recording and/or reproducing apparatus according to claim 6, wherein said opening portion includes, at right and left end portions, slits extending in a direction perpendicular to said opening portion.

* * * * *